United States Patent [19]

Dahlen et al.

[11] 3,928,595
[45] Dec. 23, 1975

[54] DIPENICILLIN AND DICEPHALOSPORIN ESTER ANTIBIOTICS

[75] Inventors: Sven Erik Dahlén; Bertil Ake Ekström; Berndt Olof Harald Sjöberg, all of Sodertalje, Sweden

[73] Assignee: Astra Lakemedel Aktiebolag, Sodertalje, Sweden

[22] Filed: Feb. 27, 1973

[21] Appl. No.: 336,194

[30] Foreign Application Priority Data
Mar. 13, 1972   United Kingdom............... 11688/72

[52] U.S. Cl. .............. 424/271; 260/239.1; 424/246
[51] Int. Cl.² ......................................... A61K 31/43
[58] Field of Search.................. 424/271; 260/239.1

Primary Examiner—Jerome D. Goldberg
Attorney, Agent, or Firm—Brumbaugh, Graves, Donohue & Raymond

[57] ABSTRACT

Compounds containing penicillanic and cephalosporanic acid moieties, of the general formula

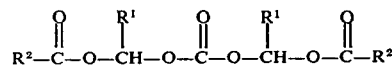

wherein $R^1$ is —H, —$CH_3$ or —$C_2H_5$ and $R^2$ is

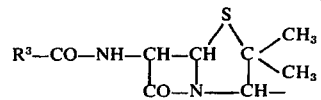

or

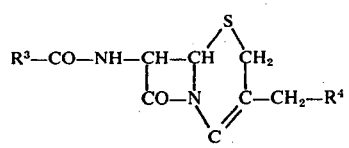

wherein $R^3$ is an organic radical, and methods for the preparation of these compounds. Pharmaceutical preparations containing these compounds are especially useful for oral treatment of infectious diseases.

2 Claims, No Drawings

DIPENICILLIN AND DICEPHALOSPORIN ESTER ANTIBIOTICS

The present invention relates to new penicillins and caphalosporins and methods for their preparation. The invention also relates to the preparation of pharmaceutical preparations containing the penicillins and the cephalosporins and to methods for the pharmacological use of the penicillins and cephalosporins.

In particular this invention relates to new esters containing penicillanic and cephalosporanic acid moieties of the following general formula

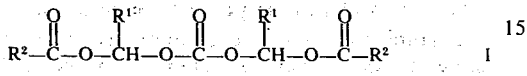

and pharmaceutically acceptable salts thereof in which formula $R_1$ is —H, —$CH_3$ or —$C_2H_5$ and
$R^2$ is

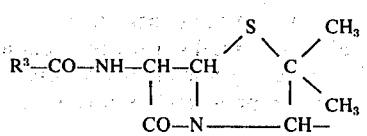

or

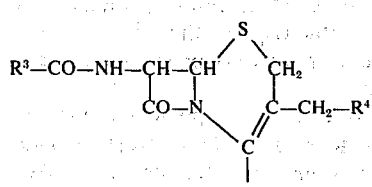

wherein $R^3$ is an organic radical such as

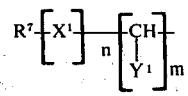

in which formula
$n$ is 0 or 1;
$m$ is 0 or 1;
$R^7$ is selected from the group consisting of a hydrogen atom, an alkyl group with 1–8 carbon atoms, a cycloalkyl group containing from 3 to 7 carbon atoms, an aryl group such as phenyl and naphthyl, and a heterocyclic group such as thienyl, furyl, pyrazolyl, pyridinyl oxazolyl, isoxazolyl, thiazolyl, isothiazolyl, thiadiazolyl, sydnonyl and tetrazolyl, which alkyl, cycloalkyl, aryl and hetero-cyclic groups can be substituted with one or more groups selected from alkyl groups with 1–3 carbon atoms such as methyl, ethyl, propyl and isopropyl, aryl groups such as phenyl, halogen atoms such as chlorine, bromine, iodine and fluorine, hydroxy groups, nitro groups, nitrile groups, azido groups, alkoxy groups with 1–3 carbon atoms such as methoxy, ethoxy, propoxy and isopropyxy, carboxy groups, carboxymethyl groups and carboxamidomethyl groups;

$X^1$ is selected from the group consisting of O and S;
$Y^1$ is selected from the group consisting of a hydrogen atom, a hydroxy group, and alkyloxycarbonyl group such as methoxy carbonyl, a halogen group such as bromine, chlorine, fluorine or iodine, anazido group, an amino group, a substituted amino group such as methylamino, diethylamino, acetamido, benzylsulphonylamino, methoxy-(hydroxy)phosphinylamino, a carboxy group, —$SO_3H$, 5-tetrazolyl, and a nitrile group and
$R^4$ is selected from the group consisting of a hydrogen atom; an alkanoyloxy group such as acetoxy or propionyloxy; a carbamoyloxy group such as methylaminocarbonyloxy; a 1-pyridinium group which may be substituted with an alkyl group with 1–3 carbon atoms, a halogen group, a hydroxy group, a nitrile group, a hydroxymethyl group, an alkoxycarbonyl group or a aminocarbonyl group; a group $S-R^5$ wherein $R^5$ is an alkyl group with 1–2 carbon atoms, a benzyl group or a heterocylic group such as imidazolyl, benzoimidazolyl, benzothiazolyl, benzoxazolyl or thiadiazolyl; a xanthate group; a dithiocarbamate group such as dimethyl, a piperidine, a 4-alkylpiperazido-, or a 4-dialkylpiperazonium dithiocarbamate; a thio-uronium group; an azido group; an alkoxy group with 1–4 carbon atoms.

The compounds of the invention are of value in the treatment of infectious diseases in man or animal caused by bacterial organisms. They may be isolated and used as such but also, depending on the presence of basic or acidic groups in the molecule, in the form of salts with pharmaceutically acceptable organic or inorganic acids or bases. Examples of suitable acids are hydrochloric acid, citric acid, and fumaric acid. Examples of suitable bases are sodium hydroxide, potassium hydroxide, calcium hydroxide, aluminium hydroxide ammonium hydroxide, non-toxic amines such as trialkylamines, including triethylamine, procaine, dibenzylamine, N-benzyl-$\beta$-phenethylamine, 1-ephenamine, N,N$^1$-dibenzylethylenediamine, dehydroabiethylamine, N,N$^1$-bis-dihydroabiethylethylenediamine, N-(lower)-alkylpiperidine (e.g. N-ethyl-piperidine) and other bases which have been used for the preparation of salts with penicillins or cephalosporins.

The side chain of the penicillin or cephalosporin structures in formula I may contain an asymmetric center. Depending on the configuration around this center the compound will occur in different diastereoisomeric forms which are all biologically active. Likewise the ester carbonate moiety may contain asymmetric atoms, e.g. when $R^1$=$CH_3$ or $C_2H_5$, giving rise to different diastereoisomeric forms which also all are biologically active. It is to be understood that the invention comprises the pure diastereoisomers as well as mixtures of them.

It is known that penicillins of the general formula:

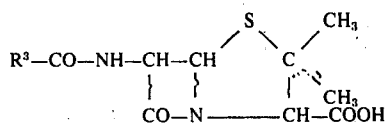

and cephalosporins of the general formula:

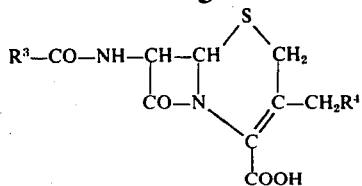

where $R^3$ and $R^4$ are as defined above, are valuable antibacterial agents, some of which have found widespread use in the treatment of infectious diseases in man and animal caused by grampositive and gramnegative bacterial microorganisms.

In combating infectious diseases it is desirable to have antibacterial agents that are well absorbed orally allowing an easy, convenient and safe treatment of the infection. Penicillins and cephalosporins are generally not completely absorbed from the gastro-intestinal tract as many of the compounds very poorly so, owing to instability to the gastric juice or inherent properties and must be given by injection. It is one purpose of the present invention to provide esters of penicillins and cephalosporins of the formula I which are well absorbed orally and then hydrolyzed within the body to give blood and organ levels of the compounds of the general formula II and III respectively that are adequate for the treatment of infectious diseases, caused by bacteria sensitive to the penicillins and the cephalosporins of the general formula II and III. To achieve the full antibacterial activity of the penicillins and cephalosporins it is necessary to choose such ester groups that are rapidly hydrolyzed in vivo under release of the penicillins and the cephalosporins. It is an essential feature of the present invention to provide such ester groups that are rapidly hydrolyzed in the body after oral absorption.

Said compounds having the formula I are well tolerated, give a low frequency of side-effects and may readily be used in pharmaceutical preparations, either as such or in the form of their salts, and they can be intermixed with solid carriers or adjuvants or both. In such preparations the ratio between the therapeutic substance and the carriers and adjuvants may vary between 1 % and 95 %. The preparation may either be processed to for instance tablets, pills or dragees or can be supplied to medical containers, such as capsules or as regards mixtures they can be filled on bottles. Pharmaceutically acceptable, organic or inorganic, solid or liquid carriers may be used, suitably for oral or enteral administration or for topical application, in manufacturing the preparations. Gelatine, lactose, starch, magnesium stearate, talc, vegetabilic and animalic fats and oils, vegetabilic rubber and polyalkylene glycol and other known carriers for pharmaceuticals are all suitable for manufacturing preparations of said compounds. Moreover the preparation may contain other pharmaceutical active components, being suitably administratable together with the compounds of the invention when treating infectious diseases, for instance other suitable antibiotical substances, e.g. gentamycin and polymyxin.

In the treatment of bacterial infections in man, the compounds of the invention are for example administered in amounts corresponding to 5 to 200 mg/kg/day, preferably in the range of 10 to 100 mg/kg/day in divided dosages, e.g. two, three or four times a day. They are administered in dosage units containing e.g. 175, 350, 500 and 1000 mg of the compounds.

Examples of preferred compounds of the invention are esters of clinically used penicillins and cephalosporins and comprise e.g. esters of
benzyl penicillin
phenoxymethyl penicillin
phenoxyethyl penicillin
phenoxypropyl penicillin
2,6-dimethoxyphenyl penicillin
3-phenyl-5-methyl-isoxazolyl penicillin
3-(2-chlorophenyl)-5-methyl-isoxazolyl penicillin
3-(2,6-dichlorophenyl)-5-methyl-isoxazolyl penicillin
3-(2-chloro-6-fluorophenyl)-5-methyl-isoxazolyl penicillin
6-(D-α-aminophenylacetamido)penicillanic acid α-carboxybenzylpenicillin
6(D-α-azidophenylacetamido)penicillanic acid
α-carboxy-3-thienylpenicillin
6-(D-α-amino-p-hydroxy-phenylacetamido)penicillanic acid
7-(2-thienylacetamido)cephalosporanic acid
7-(D-α-aminophenylacetamido)cephalosporanic acid
7-(D-α-amino-phenylacetamido)desacetoxy cephalosporanic acid cyanomethylcephalosporanic acid,
4-pyridyl-thiomethyl-cephalosporanic acid
7-(2-thienylacetamido)-2-1'-pyridylmethyl-$\Delta^3$-cephem-4-carboxylate.

Further examples of preferred compounds of the invention are collected in Table 1 and Table 2. The designation -APA- in the compounds listed in Table 2 means the radical

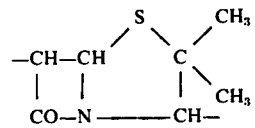

The radicals specified in Table 1 refer to the compound of the formula $$R^2{-}[X^1]_n{-}\underset{\underset{Y^1}{|}}{CH}{-}CONH{-}CH{-}\underset{CO-N}{\overset{S}{\diagup}\diagdown}\underset{R^1}{\overset{CH_2-R^4}{|}}$$

$$\underset{R^4-CH_2}{\overset{S}{\diagup}\diagdown}\underset{N-CO}{\overset{CH-CH-NHCO-CH{-}[X^1]_n{-}R^7}{\underset{Y^1}{|}}}$$

$$COO-\underset{R^1}{\overset{|}{CH}}-O-CO-O-\underset{R^1}{\overset{|}{CH}}-O-CO$$

Table 1
Example of preferred compounds of the invention

| R⁷ | X¹ | n | Y¹ | R⁴ | R¹ |
|---|---|---|---|---|---|
| H | O |  | CN | OCOCH₃ | H |
| H | O |  | CN | OCOCH₃ | CH₃ |
| H | O |  | CN | OCOCH₃ | C₂H₅ |
| H | O |  | N₃ | OCOCH₃ | H |
| C₆H₁₃ | O |  | H | OCOCH₃ | CH₃ |
| C₆H₅ | O |  | H | OCOCH₃ | C₂H₅ |
| C₆H₅ | O |  | H | OCOCH₃ | H |
| C₆H₅ | O |  | H | OCOCH₃ | H |
| C₆H₅ | O |  | H | OCOCH₃ | H |
| C₆H₅ | O |  | H | OCOCH₃ | H |
| C₆H₅ | O |  | H | OCOCH₃ | H |
| C₆H₅ | O |  | H | OCOCH₃ | CH₃ |
| m-Br—C₆H₄ | O |  | H | OCOCH₃ | CH₃ |
| C₁₀H₈ | O |  | H | OCOCH₃ | CH₃ |
|  | O |  | H | OCOCH₃ | CH₃ |
|  | O |  | H | OCOCH₃ | C₂H₅ |
|  | O |  | H | OCOCH₂ | C₂H₅ |
|  | O |  | H | OCOCH₃ | H |
|  | O |  | H | OCOCH₃ | CH₃ |
|  | O |  | H | OCOCH₃ | C₂H₅ |
|  | O |  | H | OCOC₆H₅ | H |
|  | O |  | H | OCOCH₃ | CH₃ |
| Cl(CH₂)₄— | O |  | H | OCOCH₃ | C₂H₅ |
| C₆H₅ | O | 1 | H | OCOCH₃ | H |
| C₆H₅ | O | 1 | H | OCOCH₃ | H |
| C₆H₅ | S | 1 | H | OCOCH₃ | H |
| C₆H₅ | S | 1 | H | OCOCH₃ | H |
|  | S | 1 | H | OCOCH₃ | H |
| 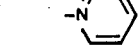 | S | 1 | H | OCOCH₃ | CH₃ |
|  | S | 1 | H | OCOCH₃ | CH₃ |
| 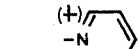 | S | 1 | H | OCOCH₃ | CH₃ |
| C₆H₅ | O |  | N₃ | OCOCH₃ | CH₃ |
| C₆H₅ | O |  | N₃ | OCOCH₃ | C₂H₅ |
| C₆H₅ | O |  | NH₂ | OCOCH₃ | C₂H₅ |
| C₆H₅ | O |  | NH₂ | OCOCH₃ | H |
| C₆H₅ | O |  | NH₂ | OCOCH₃ | CH₃ |
| C₆H₅ | O |  | NH₂ | OCOCH₃ | C₂H₅ |
| C₆H₅ | O |  | NH₂ | OCOCH₃ | H |
| C₆H₅ | O |  | NH₂ | OCOCH₃ | CH₃ |
| C₆H₅ | O |  | —COOH | OCOCH₃ | C₂H₅ |
| C₆H₅ | O |  | OH | OCOCH₃ | H |
| C₆H₅ | O |  | OH | OCOCH₃ | H |
| C₆H₅ | O |  | OH | OCOCH₃ | H |
| C₆H₅ | O |  | OH | OCOCH₃ | H |
| C₆H₅ | O |  | OH | OCOCH₃ | H |
|  | O |  | H | 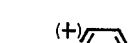 | CH₃ |
|  | O |  | H | 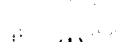 | CH₃ |
|  | O |  | H |  | CH₃ |
|  | O |  | H |  | C₂H₅ |
|  | O |  | H |  | H |
|  | O |  | H | SCH₂C₆H₅ | CH₃ |
|  | O |  | H |  | C₂H₅ |
|  | O |  | H | —S—CS—N(CH₃)₂ | H |
|  | O |  | H | 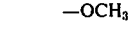 | CH₃ |
|  | O |  | H | —N₃ | C₂H₅ |
|  | O |  | H | —OCH₃ | H |
|  | O |  | H |  | H |
|  | O |  | H |  | H |

Table 1-continued

Example of preferred compounds of the invention

| R⁷ | X¹ | n | Y¹ | R⁴ | R¹ |
|---|---|---|---|---|---|
| thienyl | O | | H | 3-chloro-pyridinium | H |
| phenyl | O | | NH₂ | H | H |
| phenyl | O | | NH₂ | H | CH₃ |
| cyclohexenyl | O | | NH₂ | H | CH₃ |
| cyclohexyl | O | | NH₂ | H | CH₃ |
| cyclohexyl | O | | NH₂ | H | H |
| cyclohexyl | O | | NH₂ | H | CH₃ |

Table 2

Examples of preferred compounds of the invention

C₆H₅—CH(NH₂·HCl)—CONH—APA—COOCH₂—O—C(=O)—O—CH₂—COOCH₂—APA—NHCO—CH(NH₂·HCl)—C₆H₅

C₆H₅—CH(N₃)—CONH—APA—COOCH₂—O—C(=O)—O—CH₂—COOCH₂—APA—NHCO—CH(N₃)—C₆H₅

C₆H₅—CH₂CONH—APA—COOCH₂—O—C(=O)—O—CH₂—COOCH₂—APA—NHCO—CH₂—C₆H₅

Table 2-continued

Examples of preferred compounds of the invention

3-F-C₆H₄—CH(NH₂·HCl)—CONH—APA—COOCH₂—O—C(=O)—O—CH₂—COOCH₂—APA—NHCO—CH(NH₂·HCl)—C₆H₄-3-F

4-HO-C₆H₄—CH(NH₂·HCl)—CONH—APA—COOCH₂—O—C(=O)—O—CH₂—COOCH₂—APA—NHCO—CH(NH₂·HCl)—C₆H₄-4-OH

C₆H₄(COONa)—CH—CONH—APA—COOCH₂—O—C(=O)—O—CH₂—COOCH₂—APA—NHCO—CH—C₆H₄(COONa)

C₆H₅—CH(COOCH₂OCOOC₂H₅)—CONH—APA—COOCH₂—O—C(=O)—O—CH₂—COOCH₂—APA—NHCO—CH(COOCH₂OCOOC₂H₅)—C₆H₅ tetrazolyl-CH₂CONH—APA—COOCH₂—O—C(=O)—O—CH₂—COO—CH₂—APA—NHCO—CH₂-tetrazolyl thienyl-CH₂CONH—APA—COOCH₂—O—C(=O)—O—CH₂—COOCH₂—APA—NHCO—CH₂-thienyl thienyl-CH(NH₂·HCl)—CONH—APA—COOCH₂—O—C(=O)—O—CH₂—COO—CH₂—APA—NHCO—CH(NH₂·HCl)-thienyl Table 2-continued
Examples of preferred compounds of the invention
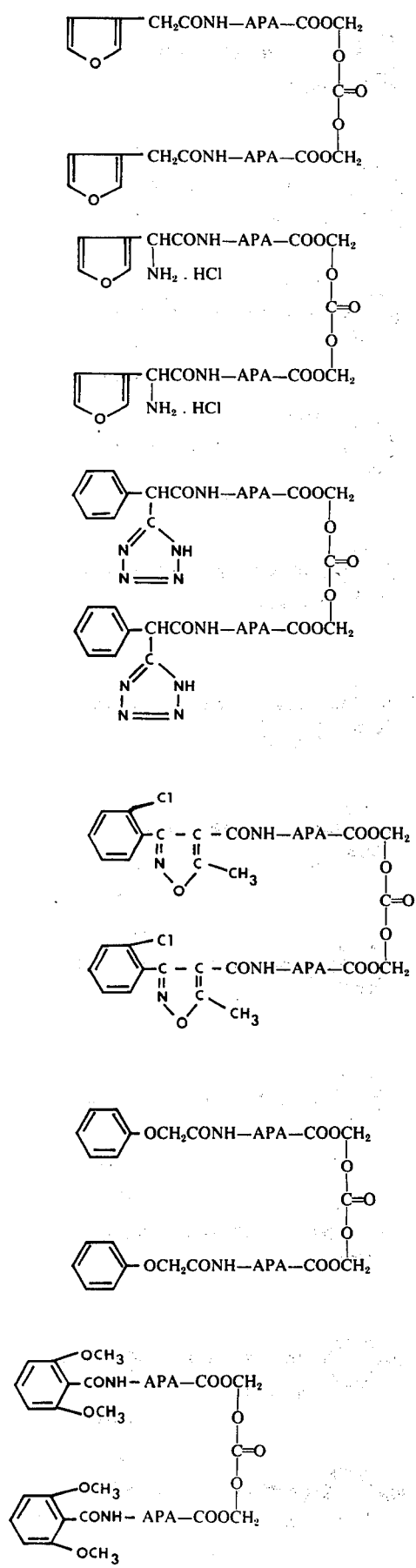
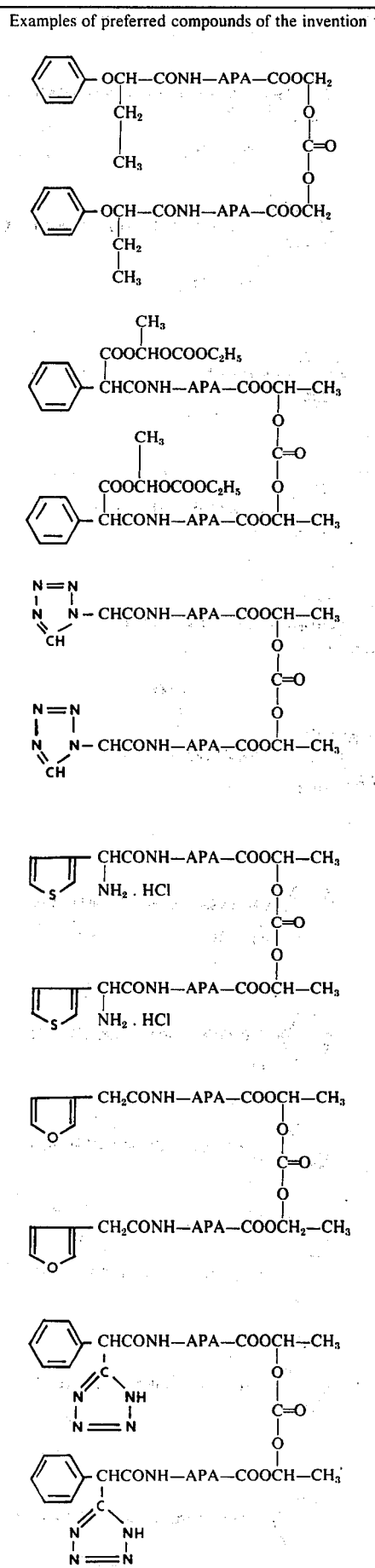

Table 2-continued

Examples of preferred compounds of the invention

[Structures shown:]

2-F-C₆H₄-C(=N-O-CH₃)-C(CH₃)=C-CONH-APA-COOCH-CH₃ (ester linked via -O-C(=O)-O- to second identical unit)

2-F-C₆H₄-C(=N-O-CH₃)-C(CH₃)=C-CONH-APA-COOCH-CH₃

C₆H₅-OCH₂CONH-APA-COOCH-CH₃
(linked -O-C(=O)-O-)
C₆H₅-OCH₂CONH-APA-COOCH-CH₃

2,6-(OCH₃)₂-C₆H₃-CONH-APA-COOCH-CH₃
(linked -O-C(=O)-O-)
2,6-(OCH₃)₂-C₆H₃-CONH-APA-COOCH-CH₃

C₆H₅-CH(NH₂·HCl)-CONH-APA-COOCH-CH₃
(linked -O-C(=O)-O-)
C₆H₅-CH(NH₂·HCl)-CONH-APA-COOCH-CH₃

C₆H₅-CH(N₃)-CONH-APA-COOCH-CH₃
(linked -O-C(=O)-O-)
C₆H₅-CH(N₃)-CONH-APA-COOCH-CH₃

C₆H₅-CH₂CONH-APA-COOCH-CH₃
(linked -O-C(=O)-O-)
C₆H₅-CH₂CONH-APA-COOCH-CH₃

Table 2-continued

Examples of preferred compounds of the invention

3-F-C₆H₄-CH(NH₂·HCl)-CONH-APA-COOCH-CH₃
(linked -O-C(=O)-O-)
3-F-C₆H₄-CH(NH₂·HCl)-CONH-APA-COOCH-CH₃

C₆H₅-CH(COOK)-CONH-APA-COOCH-CH₃
(linked -O-C(=O)-O-)
C₆H₅-CH(COOK)-CONH-APA-COOCH-CH₃

C₆H₅-CH(NH₂·HCl)-CONH-APA-COOCH-C₂H₅
(linked -O-C(=O)-O-)
C₆H₅-CH(NH₂·HCl)-CONH-APA-COOCH-C₂H₅

C₆H₅-CH(N₃)-CONH-APA-COOCH-C₂H₅
(linked -O-C(=O)-O-)
C₆H₅-CH(N₃)-CONH-APA-COOCH-C₂H₅

C₆H₅-CH₂CONH-APA-COOCH-C₂H₅
(linked -O-C(=O)-O-)
C₆H₅-CH₂CONH-APA-COOCH-C₂H₅

4-HO-C₆H₄-CH(NH₂·HCl)-CONH-APA-COOCH-C₂H₅
(linked -O-C(=O)-O-)
4-HO-C₆H₄-CH(NH₂·HCl)-CONH-APA-COOCH-C₂H₅

Table 2-continued
Examples of preferred compounds of the invention

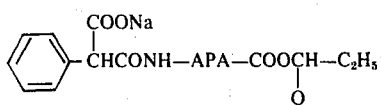
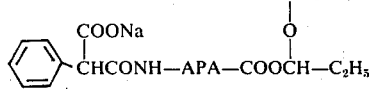
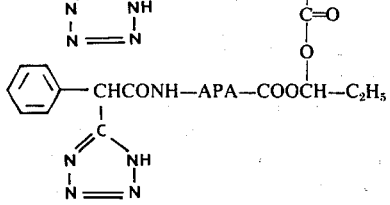
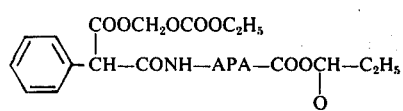
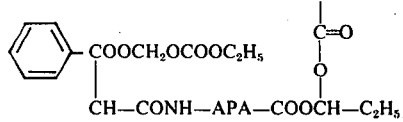
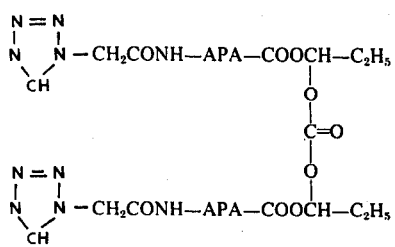
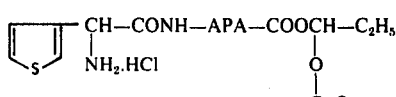
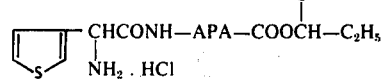

Table 2-continued
Examples of preferred compounds of the invention

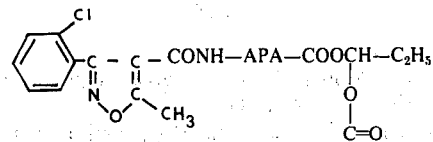
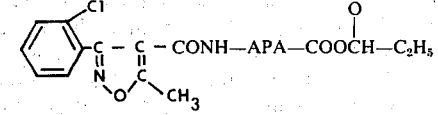
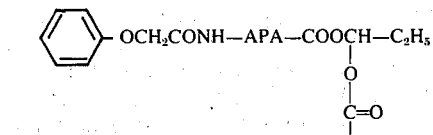
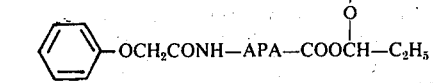

The compounds of the invention may be prepared by different methods.

Method A

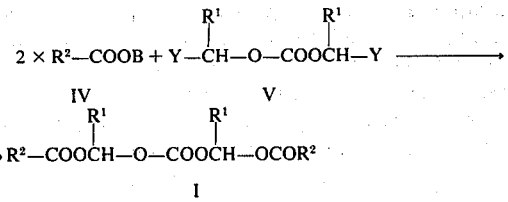

According to this method a salt of a penicillin or cephalosporin with the general formula IV where $R^2$ is as defined above and B is an organic or inorganic kation, e.g. a sodium, potassium, calcium or a trialkyl- or tetraalkylammonium ion, is reacted with a compound of formula V, where $R^1$ is as defined above and Y is halogen, e.g. chlorine, bromine or iodine or an organic sulphonic acid residue, to give the compounds of the general formula I.

The reaction may be carried out in organic solvents like acetone, tetrahydrofurane, chloroform, methylene chloride, dimethylformamide, dimethylsulphoxide or hexamethylphosphoramide or in a mixture of water and an organic solvent, e.g. aqueous dioxane or acetone.

Method B

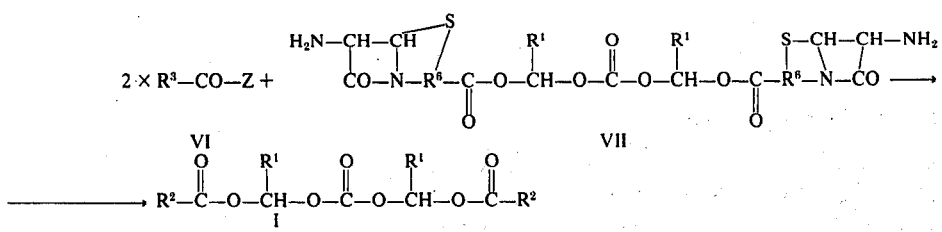

According to this method an activated carboxylic acid derivative VI where $R_3$ is as defined above and CO—Z is a reactive group capable of reacting with an amino group under formation of an amide moiety, e.g. an acid chloride or its functional equivalent is brought to react with a compound of formula VII, where $R_1$ is as defined previously and $R_6$ is

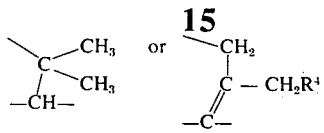

with $R^4$ as previously defined to give the compounds of the invention with formula I.

The reaction betwen VI and VII constitutes an acylation and can be performed in the manner described for acylation of esters of 6-aminopenicillanic or 7-aminocephalosporanic acids. The acylating group CO—Z in VI may be an acid chloride group, or a group functionating in the same way, e.g. an acid bromide, an acid azide, an anhydride, a mixed anhydride formed with an inorganic acid or an organic acid such as an alkyl carbonic acid, for instance isobutyl carbonic acid, a carbonic acid, a sulphonic acid and especially an alkoxyformic acid or may be a radical obtained by reacting the α-substituted phenylacetic acid and a carbodiimide or $N,N^1$-carbonyldimidazol or an other compound reacting in a similar way. The reaction can be performed in organic solvents like diethylether, tetrahydrofurane, acetone, ethyl acetate, chloroform, methylene, chloride, dimethylformamide, dimethyl sulphoxide, or hexamethylphosphoramide, in water or in aqueous organic solvents in presence of organic or inorganic bases like triethylamine, quinoline, pyridine, N-methyl-morpholine, sodium hydroxide, sodium bicarbonate or potassium carbonate.

The esters of the general structure VII may be prepared by treatment of salts of 6-amino-penicillanic acid or salts of compounds of the formula

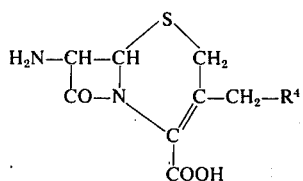

VIII wherein $R^4$ has the meaning given above, with compounds of the formula V.

The reaction is preferably performed in organic solvents like dimethylformamide, dimethylsulphoxide or hexamethylphosphoramide.

Alternatively 6-acylaminopenicillanic acids or 7-$NH_2$-acylated derivatives of compounds of the formula VIII respectively with acyl groups that can be removed without destruction of the penicillin or cephem ring systems are treated with a compound of formula V to give esters of the penicillin and cephem structures from which the acylgroups then are removed to give the esters of the formula VII. One method consists of reacting a salt, e.g. the sodium, potassium or tetraalkylammonium salt of benzylpenicillin or of a 7-phenylacetyl substituted compound of formula VIII with a compound of formula V in an organic solvent like acetone, methylethylketon, chloroform, methylene chloride, dimethylformamide, dimethylsulphoxide or hexamethylphosphoramide or in a mixture of an organic solvent and water, e.g. aqueous acetone or dioxane to give the corresponding ester. The phenlacetyl side chain is then removed according to the method described in Neth. patent specification No. 6,401,421 or South African patent specification No. 67/2927 by treatment with phosphorus pentachloride in presence of a tertiary organic base to give an imino chloride which is reacted with an alcohol like propanol to give the corresponding imino ether which is hydrolyzed by addition of water or alcoholized by addition of alcohol to give the ester VII. Alternatively the phenylacetyl side chain may be removed by enzymatic hydrolysis using an E.coli acylase in analogy to method described in French patent specification No. 1,576,027.

In still another method 6-acylaminopenicillanic acids and 7-$NH_2$-acylated derivatives of the compounds of the formula VIII respectively where the acyl groups are protecting groups, are reacted with compounds of the formula V to give the corresponding ester from which the protecting groups are removed to give the compounds of the general formula VII. Examples of protecting groups which can be used are the benzyloxycarbonyl group which is removed by catalytic hydrogenation, the o-nitro-phenylsulphenyl group which can be removed by treatment with nucleophilic agents at acid pH (Jap. pat. specification No. 505,176) and the trityl group which can be removed by mild acid hydrolysis.

Method C

According to this method a natural penicillin or cephalosporin of the formula

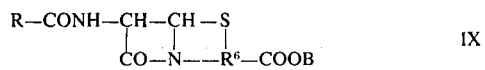

IX where RCO represents the acyl group in the side chain of the natural penicillin or cephalosporin and B and $R^6$ have the meaning specified above, is esterified by reaction with a compound of the formula

V where $R^1$ and Y have the meanings specified above, whereafter the ester of the formula

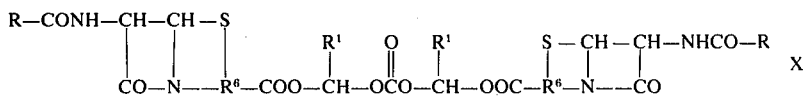

X thus formed is reacted with a phosphorous halide in an inert solvent and suitably in presence of a tertiary amine to give an imino halide, which is reacted with a lower alcohol to give an iminoether derivative, which imino ether thereafter is reacted with a compound of the formula $$R^3 - CO - Z \qquad \text{VI}$$

wherein $R^3$ and Z have the meanings specified above, and the reaction product treated with water or an alcohol to give a compound of the formula

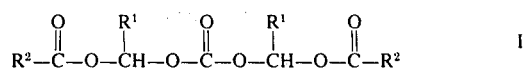

I wherein $R^1$ and $R^2$ have the meanings specified above.

In this method the intermediate imino ether compound is directly acylated without isolation of any intermediate products.

The group RCO— in the compound of the formula is an organic acyl group contained in known natural penicillins or cephalosporins. Thus the group R may be an alkyl, cycloalkyl, aryl, aralkyl or heterocyclic group and derivatives thereof. Examples of suitable groups R are heptyl, phenoxymethyl, 2-thienylmethyl, 2-furylmethyl, and benzyl. Examples of suitable phosphorous halides are phosphorous pentachloride, phosphorous pentabromide, phosphorous oxychloride, phosphorous trichloride, etc. Phosphorous pentachloride is preferred. Examples of suitable alcohols with which the imino halide may be treated are lower alkyl alcohols such as methanol, ethanol, and n-propanol.

7-acylamino-$\Delta^3$-cephem-4-carboxylic acid esters may partly rearrange into the corresponding $\Delta^2$-cephem-4-carboxylic acid esters, which are virtually without any antibacterial activity. The presence of such esters may be detected with the aid of UV, IR and NMR spectroscopy. In cases where such $\Delta^2$-esters occur they may be converted into the desired $\Delta^3$-esters by methods known to the art. e.g. by oxidising the $\Delta^2$-ester to a sulphoxide, treating this with acetyl chloride and reducing it e.g. with sodium dithionite to give the $\Delta^3$-ester. Alternatively the $\Delta^2$ and $\Delta^3$ esters may be separated from each other e.g. by chromatography.

As described above the starting material may be in the form of a salt, for instance a sodium, potassium, calcium or trialkylammonium salt, in some of the ways for the preparation of the compounds of the invention.

In addition, tetraalkylammonium salts and other analogues salts such as salts where the cation has the formula $A^1 A^2 A^3 A^4 N^+$ in which formula $A^1$ is selected from the group consisting of straight and branched alkyl groups containing from 3 to 6 carbon atoms, substituted and unsubstituted aryl, and substituted and unsubstituted aralkyl, and wherein $A^2$, $A^3$ and $A^4$, which are the same or different, are selected from the group consisting of straight and branched alkyl groups containing from 1 to 6 carbon atoms, provided that $A^2$, $A^3$ and $A^4$ are alkyl with 3-6 carbon atoms when $A^1$ is alkyl, may be used.

Illustrative examples of suitable combinations of $A^1$, $A^2$, $A^3$ and $A^4$ in the quaternary ammonium ion $A^1 A^2 A^3 A^4 N^+$ are given below:

Table I.

| Examples of suitable combinations of the radicals $A^1$–$A^4$ in the $A^1 A^2 A^3 A^4 N^+$ ion | | | |
|---|---|---|---|
| $A^1$ | $A^2$ | $A^3$ | $A^4$ |
| n-propyl | n-propyl | n-propyl | n-propyl |
| i-propyl | i-propyl | i-propyl | i-propyl |
| n-butyl | n-butyl | n-butyl | n-butyl |
| i-butyl | i-butyl | i-butyl | i-butyl |
| n-pentyl | n-pentyl | n-pentyl | n-pentyl |
| n-hexyl | n-hexyl | n-hexyl | n-hexyl |
| phenyl | methyl | methyl | methyl |
| phenyl | ethyl | ethyl | ethyl |
| p-tolyl | ethyl | ethyl | ethyl |
| p-chlorophenyl | ethyl | ethyl | ethyl |

When the radicals $A^1$–$A^4$ all are different the resulting ion contains an asymmetric centre and may occur in two enantiomeric forms. Epimeric forms can occur if $A^1$, $A^2$, $A^3$ and/or $A^4$ contain one or more asymmetric carbon atoms.

Examples of quaternary ammonium ions containing an asymmetric centre are given in Table II below:

Table II.

| Examples of quaternary ammonium ion $A^1 A_2 A^3 A^4 N^+$ containing an asymmetric centre | | | |
|---|---|---|---|
| $A^1$ | $A^2$ | $A^3$ | $A^4$ |
| benzyl | n-propyl | i-propyl | n-butyl |
| benzyl | n-propyl | i-propyl | sec.butyl |
| benzyl | n-propyl | n-butyl | sec.butyl |
| n-propyl | n-butyl | n-butyl | sec.butyl |
| n-propyl | n-propyl | n-propyl | sec.butyl |
| n-propyl | n-propyl | n-propyl | sec.pentyl |
| n-propyl | n-propyl | n-propyl | sec-hexyl |
| n-propyl | n-propyl | n-butyl | sec.hexyl |

The use as described above of a quaternary salt form of the starting material for the preparation of the compounds of this invention is not previously described in the literature pertaining to this technical field. In this method the preferred cation is the tetraalkylammonium ion, particularly the tetrabutylammonium ion. The preferred solvents are chloroform, methylenechloride and acetone.

The quaternary ammonium salt form of the above described starting material may be prepared by reacting the starting material in question with a quaternary ammonium salt of the formula $A^1 A^2 A^3 A^4 N^+ B^-$ wherein $A^1$, $A^2$, $A^3$ and $A^4$ have the meanings specified above and B is a suitable anion such as $HSO_4^-$, $CL^-$ or $CH_3COOO^-$ to the formation of a quaternary salt of the starting material.

The salts of the formula above which contains B as the anion may be prepared in known manner analogous as described in for instance Belgian Pat. No. 751,791. The anion $B^-$ is in the preferred embodiment $HSO_4^-$.

The following examples will further illustrate the invention.

Example 1

Di[6-(D-α-azidophenylacetamido)-penicillanylmethyl]-carbonate

A stirred suspension of potassium 6-(D-α-azidophenylacetamide)penicillanate (30.9 g, 75 mmole) in dry dimethylformamide (90 ml) was treated with dichloromethylcarbonate (3.99 g, 25 mmole) in dry dimethylformamide (15 ml) in the ice-bath. After 45 minutes the cooling bath was removed and stirring was continued for 15 hours. The dark reaction mixture was poured into twice its volume of 1 M potassium bicarbonate solution. The solution was extracted with ether and the ether extracts were washed with water and brine, dried and evaporated in vacuo at 30°C to give di[6-(D-α-azidophenylacetamido)-penicillanylmethyl]-carbonate (10.7 g) as a yellowish foam.

The product showed strong absorption bands in IR at 2120 cm$^{-1}$ and 1780–1750 cm$^{-1}$ attributable to the azido group and the β-lactam and ester carbonyls respectively. It was found to be rapidly hydrolyzed to 6-(D-α-azidophenylacetamido)penicillanic acid by human serum.

EXAMPLE 2

Di[6-(D-α-aminophenylacetamido)-penicillanyl-methyl]-carbonate dihydrochloride

Di[6-(α-azidophenylacetamido)-penicillanyl-methyl]-carbonate (7.2 g, 8.6 mmole) was dissolved in ethylacetate and hydrogenated for 4 hours over a prehydrogenated 5 % palladium on carbon catalyst (7 g). The catalyst was separated by filtration and washed with ethylacetate. The combined organic solutions were extracted with water by addition of dilute hydrochloric acid until pH reached 3.0. The aqueous phase was separated and freeze-dried to give the dihydrochloride of di[6-(D-α-aminophenylacetamido)-penicillanyl-methyl]-carbonate.

The product showed a purity of 79 % (iodometric). The product showed strong bands in IR at 1780–1750 cm$^{-1}$ attributable to the β-lactam and ester carbonyls and was found to be rapidly hydrolyzed to 6-(D-α-aminophenylacetamido)penicillanic acid in presence of human serum.

EXAMPLE 3

Di[6-(phenylacetamido)-penicillanyl-methyl]-carbonate

To a cooled stirred suspension of potassiumbenzylpenicillinate (55.8 g, 0.15 mole) in dry dimethylformamide (180 ml) was added dichloromethylcarbonate (8.0 g, 0.05 mole) in dry dimethylformamide during 30 minutes. The stirring was continued for 17 hours at room temperature. The mixture was poured into 500 ml of sodium bicarbonate solution and was extracted with 200+4×100 ml of ethylacetate. The combined organic extracts were washed with 4×100 ml of water and brine, dried and evaporated in vacuo to give 17.2 g of a brownreddish oil. The product was treated repeatedly with petroleum ether, dissolved in ethylacetate and evaporated in vacuo to give title product as 11.4 g of a brown heavy oil.

TLC in isopropylether-aceton 8:2 showed one main spot at r f 0.31. The product showed strong IR absorption at 1790–1750 cm$^{-1}$ due to β-lactam and ester carbonyls.

The product was rapidly hydrolyzed in presence of human serum.

EXAMPLE 4

Di[7-(D-α-azidophenylacetamido)-cephalosporanyl-methyl]-carbonate

Tetrabutylammonium hydrogen sulphate (3.4 g, 10 mmole) was dissolved in 10 ml of ice-cooled 1 N sodium hydroxide solution. Potassium 7(D-α-azidophenylacetamido)-cephalosporanate (4.7 g, 10 mmole) and 10 ml of methylene chloride were added. The mixture was shaken and the methylene chloride layer was separated. Dichloromethylcarbonate (0.8 g, 5 mmole) was added and the solution was stirred at 40°C over night. The reaction mixture was poured into 50 ml of ice-cooled sodium bicarbonate solution and was extracted with 3×50 ml of ethylacetate. The combined organic extracts were washed with sodium bicarbonate solution, water and brine, dried and evaporated to give 3.5 g of a brown gum.

The product was dissolved in chloroform (75 ml), cooled with ice while 90 % m-chloroperbensoic acid (1.7 g, 10 mmole) dissolved in 50 ml of chloroform was added during 10 minutes. Stirring was continued for 3 hours at room temperature. The solution was washed with sodium bicarbonate solution and brine, dried and evaporated to give 3.2 g of a dark oil.

The oil was dissolved in 25 ml of dimethyl formamide. Sodium dithionite (2.1 g, 12 mmole) was added. To the stirred, cooled suspension was added acetylchloride (1.2 ml, 17 mmole) over a period of 10 minutes. The stirring was continued at room temperature for 30 minutes. The mixture was poured into 50 ml of ice-cooled sodium bicarbonate solution and was extracted with 3×50 ml of ethylacetate. The combined organic extracts were washed with sodium bicarbonate solution, water and brine, dried and evaporated in vacuo to give title product as 1.4 g of a dark oil.

The product showed strong IR-absorption at 2100 cm$^{-1}$ and at 1785–1730 cm due to azido group and β-lactam and ester carbonyls respectively.

EXAMPLE 5

Di[6-(2,6-dimethoxybenzamido)-penicillanyl-methyl]-carbonate

Tetrabutylammoniumhydrogensulphate (3.4 g, 10 mmole) was dissolved in 10 ml of ice-cooled 1 N sodium hydroxide solution. Sodium 6-(2,6-dimethoxybenzamido)-penicillanate (4.0 g, 10 mmole) and 10 ml of methylene chloride were added. The mixture was shaken and the methylene chloride layer was separated. Dichloromethylcarbonate (0.8 g, 5 mmole) was added and the solution was stirred at 40°C over night. The reaction mixture was poured into 50 ml of ice-cooled sodium bicarbonate solution and was extracted with 3×50 ml ethylacetate. The combined organic extracts were washed with sodium bicarbonante solution, water and brine, dried and evaporated to give title product as 1.2 g of a white foam. The product showed strong IR-absorption at 1790–1750 cm$^{-1}$ due to β-lactam and ester carbonyls.

NMR(CDCl$_3$, tetramethylsilane as internal standard) δ = 1.50–1.70 (d), 3.80(s), 4.45(s), 5.60–6.10(m), 6.50–7.45(m) ppm.

EXAMPLE 6

Di[7-(phenylacetamido)-cephalosporanyl-methyl]-carbonate

In the same way as in example 4, title product was prepared from potassium 7-(phenylacetamido)-cephalosporante (3.7 g, 10 mmole) and dichloromethylcarbonate (0.8 g, 5 mmole) in 10 ml of methylene chloride. After the oxidation and reduction title product came out as 0.6 g of a yellowish oil.

The product showed strong IR-absorption at 1785–1730 cm$^{-1}$ due to β-lactam and ester carbonyls.

EXAMPLE 7

Di[6-(α-hydroxyphenylacetamido)-penicillanyl-methyl]-carbonate

To a stirred ice-cooled suspension of sodium α-hydroxybenzylpenicillinate (3.7 g, 10 mmole) in 10 ml of dry dimethyl sulphoxide was added dichloromethyl carbonate (0.8 g. 5 mmole) during 15 minutes. The stirring was continued over night at room temperature. The reaction mixture was poured into 50 ml of ice-cooled sodium bicarbonate solution and extracted with 3×50 ml ether. the combined ether extracts were washed with sodium bicarbonate solution, water and brine, dried and evaporated to give title product as 1.1 g of a yellow solid foam.

The product showed strong IR-absorption at 1785–1750 cm$^{-1}$ due to β-lactam and ester carbonyls.

NMR (aceton-d$_6$, tetramethylsilane as internal standard) δ=1.45–1.65(d), 4.55(s), 5.15–5.30(m), 5.50–6.00(m), 7.30–7.50(m) ppm.

EXAMPLE 8

Di[6-phenylacetamido-penicillanyl-α-ethyl]-carbonate

In the same way as in example 7 title product was prepared from potassium benzylpenicillinate (7.4 g, 0.02 mole) and di-α-chloroethylcarbonate (1.9 g, 0.01 mole) in 20 ml of dry dimethyl sulphoxide. Title product came out as 1.7 g of a brownish gum.

The product showed strong IR-absorption at 1790–1740 cm$^{-1}$ due to β-lactam and ester carbonyls. NMR (acetone-d$_6$, tetramethylsilane as internal standard) δ=1.50–1.60(d), 1.75–1.90(d), 3.65(s), 4.40(s), 5.50–5.85(m), 6.30–7.00(m), 7.35(s), ppm.

EXAMPLE 9

Di(6-aminopenicillanylmethyl)-carbonate, dihydrochloride

Di[(6-phenylacetamido)-penicillanyl-methyl]-carbonate (5.3 g, 7 mmole) was dissolved in 50 ml of methylene chloride under argon atmosphere. Quinoline (3.6 ml, 31 mmole) was added and the stirred solution was cooled to −15°C. Phosphorus pentachloride (3.36g, 16 mmole) was added over a period of 2 minutes. Stirring at −10°C for 65 minutes before n-propylalcohol (10.5 ml, 0.14 mole) was added during 5 minutes at −25°C. Stirring at −10°C for 30 minutes. 5.0 g of sodium chloride dissolved in 22 ml of water was added and the temperature rose to 0°C. Stirring at 0.°C for 30 minutes. 45 ml of petroleum ether was added. Stirring was continued at 0°C for 15 minutes. Another portion of petroleum ether (50 ml) was added and after 1 hour stirring at 0°C a brown heavy oil had separated. The oil and water phase was used directly for preparation of di[6-(D-α-azidophenylacetamido)-penicillanylmethyl]-carbonate in example 10.

EXAMPLE 10

Di[6-(D-α-azidophenylacetamido)-penicillanyl-methyl]-carbonate

Di(6-aminopenicillanylmethyl)-carbonate dihydrochloride freshly synthesized according to example 9, as an oil and water solution (7 mmole) was dissolved in 70 ml of methylisobutylketone and 100 ml of water. The pH was adjusted to 3.0 with addition of 22.9 ml of 2 N sodium hydroxide solution, to the stirred ice-cooled mixture. With autotitrator pH = 3.0 was maintained while azidophenylacetylchloride in trichloroethylene (14 mmole) was added over a period of 15 minutes. Stirring was continued for 20 minutes and the consumption of 2 N sodium hydroxide solution was 14.1 ml during the acylation reaction. The phases were separated and the water phase was washed with 2×50 ml of methylisobutylketone. The combined organic extracts were washed with 2×50 ml of sodium bicarbonate solution, water and brine, dried and evaporated to give title product as 1.5 g of a brown solid foam.

The IR-spectrum was identical with that of the product in example 1.

EXAMPLE 11

| | | |
|---|---|---|
| a) | Di[6-D-α-azidophenylacetamido)penicillanyl--methyl]-carbonate | 300 mg |
| | Starch | 100 mg |
| | Magnesium stearate | 10 mg |
| b) | Di[6-(D-α-aminophenylacetamido)-penicillanyl--methyl]-carbonate dihydrochloride | 400 mg |
| | Starch | 100 mg |
| | Magnesium stearate | 10 mg |
| c) | Di[6-phenylacetamido-penicillanyl-methyl]-carbonate | 350 mg |
| | Calcium carbonate | 100 mg |
| | Magnesium stearate | 10 mg |
| d) | Di[6-(D-α-hydroxyphenylacetamido)-penicillanyl--methyl]carbonate | 350 mg |
| | Lactose | 100 mg |
| | Magnesium stearate | 10 mg |

For filling in capsules the following formulation was made:

| | |
|---|---|
| Di[6-(D-α-aminophenylacetamido)-penicillanyl--methyl]carbonate hydrochloride | 350 mg |
| Magnesium stearate | 5 mg |

We claim:

1. A method for the treatment of infection caused by bacterial organisms comprising administering to a man or an animal suffering from said bacterial infection an anti-bacterially effective amount of di[6-(D-α-aminophenylacetamido)-penicillanyl-methyl]-carbonate or a pharmaceutically acceptable salt thereof.

2. A pharmaceutical preparation for treating infection caused by bacterial organisms which comprises, as an active ingredient, an anti-bacterially effective amount of di[6-(D-α-aminophenylacetamido)-penicillanylmethyl]-carbonate or a pharmaceutically acceptable salt thereof and a pharmaceutically acceptable carrier.

* * * * *